April 7, 1959 W. S. TANDLER 2,880,516
GAUGING HEAD AND MASTER FIXTURE FOR MULTIPROBE GAUGING APPARATUS
Filed April 13, 1955 3 Sheets-Sheet 1

INVENTOR.
WILLIAM S. TANDLER
BY
HIS ATTORNEYS.

April 7, 1959 W. S. TANDLER 2,880,516
GAUGING HEAD AND MASTER FIXTURE FOR MULTIPROBE GAUGING APPARATUS
Filed April 13, 1955 3 Sheets-Sheet 2
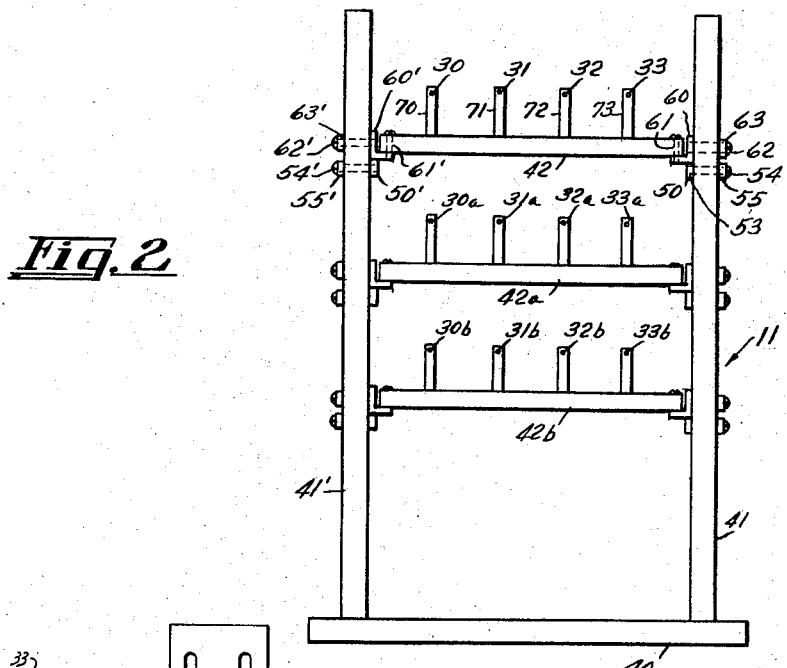
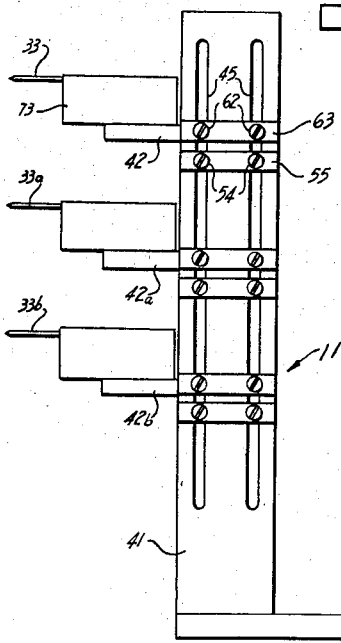
INVENTOR.
WILLIAM S. TANDLER
BY
Campbell, Brumbaugh, Free
& Graves
HIS ATTORNEYS.

April 7, 1959     W. S. TANDLER     2,880,516
GAUGING HEAD AND MASTER FIXTURE FOR MULTIPROBE GAUGING APPARATUS
Filed April 13, 1955     3 Sheets-Sheet 3

INVENTOR.
WILLIAM S. TANDLER
BY
HIS ATTORNEYS.

United States Patent Office 2,880,516
Patented Apr. 7, 1959

2,880,516

GAUGING HEAD AND MASTER FIXTURE FOR MULTIPROBE GAUGING APPARATUS

William S. Tandler, New York, N.Y., assignor, by mesne assignments, to The Warner and Swasey Company, Cleveland, Ohio, a corporation of Ohio Application April 13, 1955, Serial No. 501,014

4 Claims. (Cl. 33—174)

This invention relates generally to apparatus for gauging a three-dimensional test part by a plurality of probes. More particularly, this invention relates to a multiprobe gauging head for such apparatus and to a master fixture for setting the probes on the head to conform to a preselected three-dimensional contour.

An object of the invention is to provide for such apparatus a multiprobe gauging head characterized by ruggedness, dimensional stability, inexpensiveness, and versatility in conforming to three-dimensional contours of different shapes.

Another object of the invention is to provide for such head a master fixture capable of setting with great accuracy the probes on the head to conform with a preselected contour.

These and other objects and advantages of the invention are realized, according thereto, by providing a gauging head which mounts a plurality of parallel probes in such manner that the probes are adjustably positionable, relative to each other, in the direction of probe extension and in at least one other direction. Such objects and advantages are also realized by providing, in accordance with the invention, a master fixture having a plurality of stop elements corresponding with the probes on the head, the stop elements causing a preselected three-dimensional contour to be defined by the tips of the probes at a time when the fixture is in place and when the probes are brought to bear against their corresponding stop elements on the fixture.

For a better understanding of the invention reference is made to the following detailed description of an embodiment thereof, taken together with the accompanying drawings wherein:

Fig. 2 is a front elevation, looking in Fig. 1 from the fixture towards the head, of the probe head in Fig. 1, the elevation view of Fig. 2 being taken as indicated by the arrows 2—2 of Fig. 1;

Fig. 3 is a side elevation of the probe head in Fig. 1;

In the description to follow, it will be understood that like elements will be designated by like numbers, and that, unless otherwise noted or required by the context, a description of one such element is properly applicable to the correspondingly numbered elements.

Figures 1, 7:
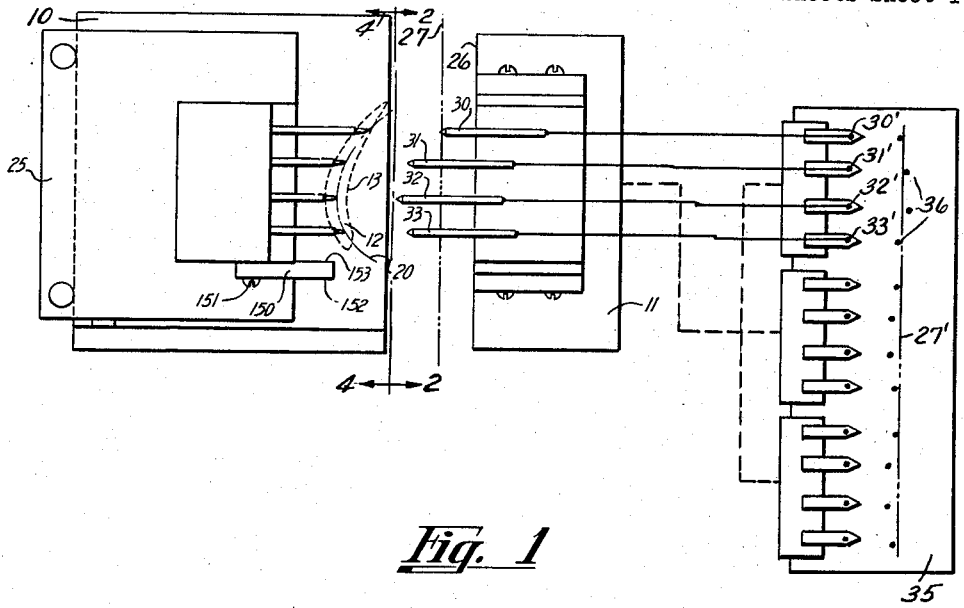
Fig. 1 is a plan view of the probe head and master fixture as located in a generally represented multiprobe gauging apparatus.
Fig. 7 is a plan view of the master fixture showing the mode of adjusting a plurality of pins thereon in position.

Referring now to Fig. 1, there is shown therein a test part holder 10 and a probe head 11, both of these elements being components of a multiprobe gauging apparatus, which, not being a part of the present invention, is not illustrated in detail herein. This gauging apparatus may (with distinctions hereafter mentioned) take the general form, for example, of the apparatus described in U.S. Patent, 2,697,879, issued on December 28, 1954, to W. S. Tandler, et al., the referred to apparatus being illustrated in Figs. 20–34 of this patent.

As described in the patent, the holder 10 during a gauging operation carries, in a predetermined position thereon, a test part 12 (shown in dotted outline). The test part 12 is so mounted on the holder that one or more portions of the part are referenced to bear an accurately predetermined position with respect to the holder.

The test part 12, which may be, say, a turbine blade, has formed thereon a three-dimensional surface 13. For purposes of clarity the test part as shown in Fig. 1 is displaced such that the ideal contour 20 and the actual test part surface 13 are not coincident.

In order for the part to be acceptable, the surface 13 must conform to certain preselected dimensional specifications. As an example, the separate points on surface 13 may be required to be so dimensionally related to each other that the surface conforms at any point within specified tolerances to the shape of a three-dimensional ideal contour. As a more stringent requirement than mere conformity in shape, the surface 13 may, in addition, be required to likewise conform within the said limits to the contour when the contour has a fixed angular and translational position with respect to a reference datum on the test part. The reference datum may be, say, one of the mentioned portions thereof which is referenced with respect to the holder when the test part is mounted on the holder.

Note, in such instance, that the referenced relation of the mentioned test part portion to the holder has the effect of referencing, in turn, the contour to the holder. The ideal contour is thus characterized by an accurately predetermined position with respect to the holder as well as with respect to the test part. The mode of establishing such fixed position for the contour with respect to the holder is discussed hereafter in connection with the detailed description of the master fixture.

An ideal three-dimensional contour of the sort described above is represented by the dot-dash line 20 in Fig. 1, the line 20 actually showing a two-dimensional outline of the contour taken in a horizontal plane above the holder 10. Another two-dimensional outline of the contour, this time taken in a vertical plane, is shown by the dot-dash line 20' in Fig. 5.

While the dimensional characteristics of the surface 12 may be determined in terms of deviation from an ideal or perfect contour, it is evident that such dimensional characteristics may also be determined in terms of other three-dimensional contours, as, say, an inside tolerance contour, an outside tolerance contour, or both. Thus, the word "contour" as used herein refers, unless otherwise required by the context, to any contour which is used as a dimensional reference datum. Also, in this connection, it will be understood that the word "gauging" as used herein denotes an operation which, working from a reference datum, determines dimension either as a "yes-no" acceptability indication, or as a quantitative indication of the deviation of the tested surface from the reference datum.

To set up the apparatus of Fig. 1 for gauging, a master fixture 25 is mounted in accurately predetermined position on holder 10. This master fixture, as further described in detail, both defines a preselected ideal three-dimensional contour and locates this contour in an accurately predetermined translational and angular position with respect to holder 10.

After the fixture 25 has been so mounted, the probe head 11 is moved, by a relative closing movement with holder 10, from the shown starting position in the longitudinal direction to a position wherein the front edge 26 of the head is located in space at a position indicated by the dot-dash line 27. This position indicated by line 27, represents a reference position for the head in the sense that the head, when so located, has an accurately predetermined displacement value with respect to the holder.

The head 11 mounts a plurality of resilient probes of which the group of probes designated 30—33 are mounted topmost. Other groups of probes mounted by the head 11 at lower levels are not shown in Fig. 1. Each of the probes is independently adjustable in longitudinal position on head 11. As will be appreciated, the plurality of probes altogether form a two-dimensional array in directions which are, respectively, transverse to the longitudinal direction and normal to the transverse direction just mentioned.

With probe head 11 occupying its reference position (line 27), the probes on the head are, by using the master fixture in a manner later described, respectively adjusted in position on head 11 to render the tips of the probes collectively definitive of the ideal contour 20. The probe head 11 is then retracted to its starting position.

When a gauging operation is to be conducted, the master fixture 25 is removed, and a test part 12 to be gauged is mounted on the holder 10. Thereafter, the probe head 11, under the urging of an automatically-controlled drive means (not shown) is moved from the starting position through the reference position (line 27) and past the reference position until the tips of all the probes on the holder have engaged with the surface 13 to be gauged.

While the probe head is so moving, a corresponding synchronous relative movement takes place between a record strip 35 and a plurality of recording styli disposed in line and moving over the strip at right angles to the line of styli. The styli are subdivided into groups, each group of styli corresponding to a separate group of probes. Each stylus is electrically actuated by a respective probe. Thus, in Fig. 1 the group of styli designated 30'—33' are actuated, respectively, by the group of probes 30—33, while the other shown groups of styli are actuated in like manner by respective groups of probes underlying probes 30—33.

To consider the actual record obtained, each probe as it engages with surface 13 of test part 12 develops an electrical signal which causes the corresponding stylus to make a mark 36 upon the record strip. Also, there is established in some suitable manner on the record strip a reference line 27' corresponding to the reference position (line 27) of the probe head 11. From the description given hereinbefore, it will be seen that the reference line 27' on the record strip is the straight line representation of the ideal contour 20. It follows that the respective displacements on the record strip of the recorded stylus marks 36 from the reference line 27' represent the extent and direction by which the test surface 13 deviates from the ideal contour 20 at the places where the probes engage the test surface. The different groups of styli represent deviation of the test surface 13 at different probe levels.

As stated, the gauging apparatus just described conforms, with certain distinctions, to the form of apparatus described in the aforementioned patent and illustrated in Figs. 20-34 therein. As to the distinctions, in the apparatus of the patent the dimensional characteristics of the surface are determined by moving the test part to different stations and by probing the surface at each station with a group of probes mounted at a different level. In contrast, in the gauging apparatus which employs the described probe head and master fixture, there is no necessity for moving the test part to different stations, since, by virtue of the plurality of probe groups mounted at different levels on a single head, the entire gauging of the test part surface is accomplished in a single action. Also, in the presently described gauging apparatus, both sides of a test part may be gauged simultaneously by using two probe heads 11 which approach the test part from opposite directions.

Referring now to Figs. 2 and 3, the probe head 11 comprises a transversely extending base 40 and a pair of transversely spaced standards 41, 41', each standard extending normally from the base. The standards 41, 41' act as a support means for a plurality of transversely extending, parallel platforms 42, 42a, 42b, the platforms being normally spaced with respect to each other. To provide for attachment between the platforms and the standards, the probe head 11 is provided with a plurality of fastening means respectively corresponding with the plurality of platforms. Each fastening means is independently adjustable in normal position to render the platform associated therewith likewise adjustable in normal position.

Considering the details of the fastening means, the standard 41 is transversely slotted through (Fig. 3) by a pair of normally running slots 45. The standard 41' is slotted in like manner. A typical fastening means is the fastening means for platform 42. This fastening means comprises a platform support means (Fig. 2) in the form of a pair of shelf members 50, 50' at opposite ends of the platform. The shelf member 50 has formed therein a pair of threaded holes 53 which register with the slots 45 of the standard 41 when the shelf is appropriately disposed, against the inside wall of the standard. A pair of mounting screws 54 pass through a separator block 55, respective ones of the slots 45, and into the threaded holes 53 to fasten the shelf member 50 to the standard. By loosening and tightening the screws 54, the shelf member 50 may be adjusted from one to another desired vertical position on the standard.

The shelf member 50' (details of which need not be shown) is substantially of the same construction as shelf member 50, is attached in like manner and is adjustable in normal position on standard 41' in the same way that shelf 50 is adjustable on standard 41.

The platform 42 has attached to opposite transverse ends thereof a pair of L-shaped edging members 60, 60'. The right-hand edging member 60 is held to platform 42 by a screw 61 passing downward through the platform into the lower horizontal arm of the edging member. After the shelf members 50, 50' have been adjusted to preselected vertical positions, the platform 42 is placed so that it rests loosely by its edging members 60, 60' on the two shelf members. Thereafter, the platform is locked to standard 41 by a pair of screws 62 which pass through a separator block 63, respective ones of the slots 45, and into the vertical arm of the edging member 60. The left-hand edging member 60', details of which are not shown, is constructed like edging member 60, and provides for locking of the platform 42 to standard 41' in a similar manner.

It will be recognized that a number of advantages inhere in the described fastening means for platform 42. For example, in lieu of setting platform 42 to a preselected vertical position by taking dimensional measurements directly to or from the platform, the shelf members 50, 50' are initially adjusted on standards 41, 41' to vertical positions which allow for the extra vertical distance taken up by the platform when resting on the shelf members, and the platform then becomes, by the mere placing thereof on the shelf members, vertically positioned in the preselected manner. This feature of utilizing adjustable members, detachable from the platform, to establish the preselected setting of the platform antecedent to actual positioning thereof, is advantageous in that the adjustment which is made is not complicated by the otherwise required factor of keeping the platform in horizontal alignment during adjustment in vertical level.

The platforms 42a, 42b have fastening means which, being counterparts of the above-described fastening means for platform 42, need not be shown in detail herein.

The platform 42 carries a plurality of transversely spaced probe carriers 70—73 which, in turn, respectively carry the aforementioned probes 30—33. Each probe carrier provides a form of mounting for its probe so that, first, before engagement, the tip of the probe is adjustably disposable to a preselected longitudinal position, and, second, upon engagement, the probe, longitudinally, is resiliently displaceable with respect to its carrier. Other groups of probes 30a—33a and 30b—33b are respectively supported on platforms 42a, 42b in like manner.

It will be evident that in order to gauge test parts having surfaces of different sizes and shapes, the probes may have different transverse spacings along the platforms. For the same reason, the described probe head 11 permits different normal spacings to be obtained between the shown groups of probes 30—33, 30a—33a and 30b—33b. These differences in normal spacings are, of course, obtained by adjusting the spacings of platforms 42, 42a, 42b with respect to each other. It will be appreciated, by virtue of the above-described modes of adjustment of the probes in position, that the same probe head 11 may be used to gauge different size and/or shape test parts, the probes being set up in each instance to accommodate the particular test part. On the other hand, it has been found more convenient and time saving to use interchangeable heads, the probes on each head being quasi-permanently set up to gauge a particular form of test part.

Figures 4, 5:
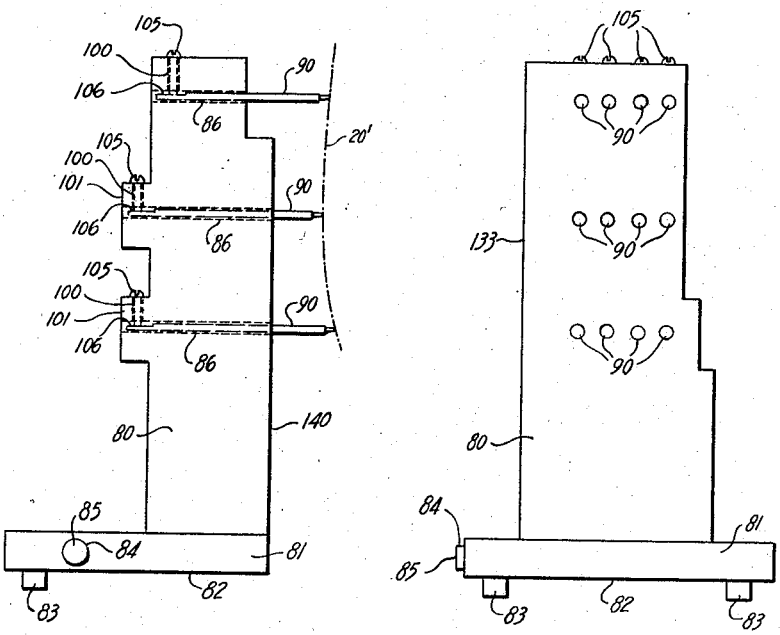
Fig. 4 is a front elevation, looking in Fig. 1 from the head to the fixture, of the master fixture of Fig. 1, the elevation view of Fig. 4 being taken as indicated by the arrows 4—4 of Fig. 1.
Fig. 5 is a side elevation of the master fixture of Fig. 1.

Referring now to Figs. 4 and 5 which, with Fig. 1, illustrate the master fixture, this fixture is comprised of an upright pin support member 80 on a base 81 having an accurately machined bottom face 82, a pair of accurately machined vertical reference pins 83 projecting downward from face 82 at the rear of the base, and another horizontal reference pin 84 projecting from the side of the base and having an accurately machined outer face 85. The purpose of these reference pins will be later explained.

The pin support member 80 is in the form of a block exceeding in transverse and normal dimension the size of the test parts to be gauged, and has formed therein a plurality of longitudinally extending parallel pin holes 86. Preferably, the pin holes 86 extend in the member from the front side thereof (the side facing the probe head 11) entirely through the member to the back side thereof. The plurality of pin holes 86 on a given master fixture respectively correspond in number, and in position in the transverse and normal directions, with the number and the position in like directions of the probes on a given probe head 11 to be set up by the given master fixture. Thus where, as in the present instance, the probes on the head are arranged in transversely extending rows spaced normally one from the other, the pins on the master fixture are also arranged in transversely extending rows spaced normally one from the other.

The plurality of pin holes 86 act as receptacles for a plurality of pins 90 which are received in slidably fitting relation within the holes and which extend outward thereof to project beyond the front of the pin support member 80.

As is seen in Figs. 1 and 5, the various pins 90 carried by the pin support member 80 are respectively longitudinally positioned, when set up, to render the outer ends of the pins conforming to the aforementioned ideal three-dimensional contour. In order to lock the pins in the contour-defining positions thereof, the pin support member 80 has formed therein a plurality of threaded screw holes 100 which respectively intersect with the pin holes 86 towards the rear thereof. As best shown in Fig. 5, the screw holes 100 are preferably vertical with the top row of screw holes providing access from the top surface of member 80 to the top row of pin holes 86. In order that the lower rows of screw holes may also be vertical, the pin support member 80 on the back side thereof is provided with outwardly projecting ledge portions 101 which may be either unitary with the member or which, preferably, are separate portions joined to the member by conventional fasteners (not shown). Each lower row of pin holes 86 continues through a respective ledge portion 101 to emerge from the back end thereof. The form of these ledge portions permits the threaded screw holes 100 for the lower level pin holes 86 to be also vertical, the screw holes being formed in the ledge portions to provide access from the top surfaces thereof to the pin holes running therethrough.

As a means to complete the locking of the several pins 90 in their holes 86, each of the holes 100 receives a locking screw 105. These locking screws by rotation thereof are brought to bear against flats 106 formed on the pins 90 to the rear thereof. Thus, when the screws 105 are tightened against the flats 106, the pins will be locked against translatory movement so that an ideal contour, when once arrived at by positional adjustment of the pins, can be permanently maintained.

Figure 6:
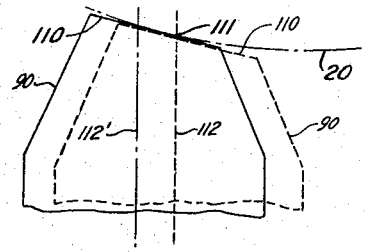
Fig. 6 is an enlarged plan view of the contouring-defining end of one of the pins of the fixture.

As a feature of importance in connection with the invention, the contour-defining end of each pin 90 is not, as is usual, tapered to a sharp point, but is instead shaped to have a face which is angled to substantially conform to the transverse slope of the ideal contour at the place occupied by the end of the pin. One of such angled pin faces, designated 110, is shown in Fig. 6. As to the significance of the angled characteristic of face 110, in making the measurements to adjust a pin 90 in translational position within its hole 86, it must be assumed that the center line of the pin has a specified value of displacement in the transverse direction. Proceeding on this assumption, a point 111 is located in space, this point in space lying on the ideal center line 112 for the pin and representing the point to which the end of the pin should be advanced in order to define the ideal contour 20. If reality corresponds with assumption, so that the transverse position of the pin 90 does, as indicated by the dotted outline (Fig. 6), have the ideal center line 112, the pin face 110 (indicated by a dotted line) of this ideally positioned pin will, of course, conform to the transverse slope of contour 20. It is much more likely, however, due to inherent limitations in the accuracy of machining, that the pin in its transverse position will offset somewhat (as indicated by the solid outline) from its ideal position, so that there is a small displacement between the ideal center line 112 and the actual center line 112'. In this situation, if the point 111 is, as before, located in space, and the pin 90 is advanced until the angular face 110 thereof reaches the point 111, the transverse offset of the pin will be compensated for by the angularity of the end of the pin, and this end face 110 in its actual position (shown by the solid outline) will still conform very closely to the ideal contour 20.

Naturally, if the pins 90 have angular end faces as described, there must be some assurance that the pins will not rotate within holes 85 with consequent angular misalignment of the end faces. This assurance is provided by the cooperation of the flats 106 of the pins with the locking screws 105, to give a locking action which renders it impossible for the pins to rotate.

There will now be considered the mode by which the various pins 90 of master fixture 25 are translationally adjusted in position to define the ideal contour 20. As shown in Fig. 7, for example, the test part holder 10 is formed to have a flat upper surface 120 which supports the bottom of master fixture 25, a back edge 121 and a face 122 representing the side wall of a vertical side portion 123 of the holder. The elements 120, 121 and 122 are accurately machined to each establish a reference datum of precise predetermined position on the holder.

As a first step, the master fixture 25 is placed on holder 10 with the accurately machined bottom face 82 of the fixture resting on the support surface 120 of the holder. The abutment of these two surfaces results in a highly accurate alignment of the fixture 25 on the holder with respect to the angular position of the fixture in both of two mutually perpendicular angles which are measured from the vertical. Also, the mentioned abutment of the two surfaces 82 and 120 results in highly accurately translational positioning of the holder in the normal direction.

As a second step, the fixture 25 is slid on the holder 10 towards the probe head 11 until both of the pins 83 bear against the back edge 121 of the holder. As stated heretofore the pins 83 are accurately machined reference pins. Thus, portions of the pins which are tangent to a common frontal line are such as to together define a primary locating face for the fixture. The effect of bringing the pins 83 to bear against back edge 121 is, first, to accurately align fixture 25 on holder 10 with respect to angular position in the horizontal, and, second, to also align accurately the fixture 25 in its longitudinal translational position on the holder.

As a third step, the fixture 25 is slid sidewise on holder 10, with the pins 83 being maintained against back edge 121, until the outer face 85 of pin 84 on the fixture comes into contact with the side wall 122 on the holder. As stated, the outer face of side pin 84 is accurately machined. Thus, this face 85 provides another primary locating face for the fixture. Accordingly, the effect of bringing pin 84 to bear against side wall 122 is to accurately locate the fixture on the holder in translational position in the transverse direction.

It will be seen, by virtue of the three steps just described, that the fixture 25 is rendered referenced with respect to the holder for all of three mutually perpendicular angles which are necessary to define the orientation of the fixture in space. Also, by virtue of the three steps just described, the fixture is accurately aligned in all of the three mutually perpendicular dimensions which are necessary to define the translational position of the fixture in space.

Following this culminating locating step, the fixture 25 is affixed to holder 10 by a pair of bolts 126, 127 (Fig. 7) which pass through holes (not shown) in the base 81 of the fixture to be received into threaded holes (not shown) in the holder 10. The holes in base 81 are made slightly larger in diameter than the bolts 126, 127 in order that the translational position of the fixture 21 be governed by the reference pins 83 and 84 rather than by the attaching bolts. Thus, in both angular orientation and translational position the fixture 25 is fully aligned with the holder 10.

With the fixture 25 so fully aligned, it will be seen that each pin 90 thereof is given a preselected angular alignment, and that, further, each pin 90 is given preselected normal and transverse translation position values, these actual pin position values being substantially the same as the transverse and normal position values which have, beforehand, been assumed for the pins in making the calculations as to how the ideal contour 20 is to be laid off by the pins. Accordingly, in order to use the pins to define the ideal contour 20 in an angularly and translationally predetermined and highly precise position with respect to the fixture 25 (and thus with respect to the holder 10), there is required only the final step of adjusting the translational position of the pins in the longitudinal direction.

This final step is accomplished by the utilization of a single probe gauging apparatus similar, for example, to the gauging apparatus disclosed in the aforementioned U.S. patent, No. 2,697,879, issued on December 28, 1954, in the name of W. S. Tandler et al., the referred-to apparatus being illustrated in Figs. 7–19 therein. As shown in Fig. 7 herein, the probe 130 of such apparatus is first brought to the vertical level of a pin 90 to be laid off, and is then moved along the paths 131, 132 to be brought into contact with a side wall 133 for the pin support member 80. This side wall 133 occupies an accurately predetermined position with respect to the outer face 85 of reference pin 84 on the fixture. Hence, the side wall 133 acts as a secondary locating face for the fixture, and, as such, serves as a reference datum to permit the assignment of a specified transverse position value to the probe 130 when in contact with the side wall. Thus, for example, for convenience the probe 130 when in contact with side wall 133 may be assigned the transverse position value "1.00000." A secondary locating face of this sort is useful, since it is evident that with the primary locating face 85 of pin 84 being in abutment with side wall 122 of the holder, it would be difficult if not impossible to reference the probe 130 to the primary locating face.

Following establishment of its transverse position value, the probe 130 is backed off from side wall 133 along a portion of path 132, and is then advanced by way of the shown paths (Fig. 7) 134, 135, 136 to be brought into contact with a front wall 140. The wall 140 occupies an accurately predetermined position with respect to the edge-contacting faces of pins 83, and hence, may be used as another secondary locating face for the fixture whereby a specified longitudinal position value may be assigned to the probe 130 when in contact with the front wall. Thus, for example, the probe 130, when in contact with front wall 140, may be assigned the position value in the gauging direction of "0.00000." The secondary locating face just described has utility for reasons alike to those described for secondary locating face 133.

With both the basic transverse position and the basic longitudinal position of probe 130 being so established in terms of the master fixture 25, the probe 130 is retracted from front wall 140 along path 136 and then along a path 141 representing an outward continuation of path 136. The probe 130 is then given along a transverse path 145 an amount of transverse displacement which, as referenced to the basic transverse position of the probe, equals the assumed transverse displacement of the pin 90 furthermost from the side wall 133 of the fixture. In fact, subject to the slight deviation shown in Fig. 6, between the theoretical and actual center lines of this pin 90 (this deviation being compensated for by the angled end face 110 of pin 90), the described displacement of probe 130 in path 145 brings the probe into transverse coincidence with the pin 90.

When transverse coincidence has been reached, the probe 130 is advanced in the longitudinal direction along the path 146 by a displacement which is referenced in amount to the basic longitudinal position of the probe, and which is of such precalculated amount that the tip of the probe locates a point in space which is part of the ideal contour 20. An example of such point is the point 111 in Fig. 6. With the tip of the probe held at this point, the pin 90 is advanced forward until the end face 110 of the pin just bears against the probe tip. As discussed in connection with Fig. 6, with the pin 90 set to such translational position, the end face of the pin conforms to the ideal contour 20. The pin 90 is then locked to this translational position as heretofore described.

Each of the remaining pins of the master fixture 25 is set in a similar manner to conform to the ideal contour. Thus, the pins 90, when taken altogether, define in the space in front of the holder 10 the ideal contour 20 as to both significant aspects thereof, namely the shape thereof and the predetermined position thereof, angularly and translationally, with respect to the holder 10. The characteristics of the fixture 25 are such that the pins 90 are capable of so defining the ideal contour to the nearest 1/10,000 of an inch.

With the ideal contour 20 so defined by the master fixture 25, the probe head 11 is, as heretofore described, advanced to reference position so that its front edge 26 is at the line 27. With the head so advanced, each probe is adjusted in longitudinal position until the tip of the probe just bears against the end face of the corresponding pin. When such adjustment has been made for every probe, the ideal contour defined by pins 90 will be transferred to the probes of the head 11 in the sense that, for the reference position of the head, the probe tips coincide both in shape and position to the contour. The contour is also transferred to the probes in the further sense that the probe tips will continue to define the shape of the ideal contour as the head is moved off the reference position. Accordingly, it is seen that, during a gauging operation, the probe head will obtain the desirable form of record shown in Fig. 1 and described hereinabove.

The above-described embodiment being exemplary only, it will be understood that the present invention comprehends organizations differing either in form or in detail from the above-described embodiment. For example, the invention may include an auxiliary referencing member 150 (Fig. 1) attached to the side wall 133 of pin support member 80 by a mounting screw 151. The member 150 has opposite faces 152 and 153 which, transversely, are each of accurately predetermined position with respect to the outer face 85 of pin 84. These two faces provide a convenience in laying off displacement distances in that either face may be used to establish the basic transverse position of the probe 130 (Fig. 7). The one of the faces 151, 152 chosen for a given pin, currently being brought to contour-defining position by the probe 130, is the face which "looks" the same way, transversely, as the end face of the pin.

Accordingly, the invention is not to be considered as limited save as is consonant with the scope of the following claims.

I claim:

1. A master fixture for use with a gauging head which mounts a plurality of probes extending in a longitudinal direction and forming a two-dimensional array in directions which, respectively, are transverse to said longitudinal direction and normal to said transverse direction, said fixture being adapted to relatively position the tips of said probes to conform to a preselected three-dimensional contour representing a reference datum for a mechanical part to be gauged by said probes, said fixture comprising, a pin support member having formed therein a plurality of pin holes extending longitudinally and respectively corresponding with said probes in number and relative position in said transverse and normal directions, a plurality of pins with probe contacting ends, said pins being received into and translationally slidable in said holes, the said ends of said pins projecting outwards from the front of said member and the said probe contacting end of each pin being shaped to have an end face which angularly conforms to a preselected slope for said contour at the position occupied by the end of the pin in defining said contour, and means for locking said pins in said holes at respective translational positions rendering the ends of said pins definitive of said contour and for locking said pins against rotation in said holes.

2. A fixture as in claim 1 wherein said member is formed to have a portion projecting longitudinally outwards from the back thereof and wherein at least some of said pin holes pass through said projecting portion, said projecting portion having formed therein a plurality of threaded screw holes which respectively intersect with the pin holes in said projecting portion and which are adapted to receive screws for locking the positions of the pins in the last named holes.

3. A master fixture for use with a gauging head which mounts a plurality of probes extending in a longitudinal direction and forming a two-dimensional array in directions which, respectively, are transverse to said longitudinal direction and normal to said transverse direction, said fixture being adapted to relatively position the tips of said probes to conform to a preselected three-dimensional contour representing a reference datum for a mechanical part to be gauged by said probes, said fixture comprising, a pin support member having formed therein a plurality of pin holes extending longitudinally and respectively corresponding with said probes in number and relative position in said transverse and normal directions, a plurality of pins with probe contacting ends, said pins being received into and being translationally slidable in said holes, the said ends of said pins projecting outwards from the front of said member, the probe contacting end of each pin being shaped to angularly conform to a preselected slope for said contour at the position occupied by said pin end in defining said contour, the pins having rearward flats formed therein, said member having formed therein a plurality of threaded screw holes respectively intersecting said pin holes and adapted to receive screws which on being brought to bear against the flats of said pins are adapted to forestall rotation of said pins in said pin holes.

4. A master fixture for use with a gauging head which mounts a plurality of probes extending in a longitudinal direction and forming a two-dimensional array in directions which, respectively, are transverse to said longitudinal direction and normal to said transverse direction, said fixture being adapted to relatively postion the tips of said probes to conform to a preselected three-dimensional contour representing a reference datum for a mechanical part to be gauged by said probes, said fixture comprising, a base incorporating a plurality of portions having formed thereon respective primary locating faces adapted by being brought to bear against corresponding portions of a holder for said mechanical part to locate said fixture with respect to said holder, a pin support member mounted on said base, said member having formed therein a plurality of pin holes extending longitudinally and respectively corresponding with said probes in number and relative position in said transverse and normal directions, a plurality of pins with probe contacting ends, said pins being received into and being translationally slidable in said holes, the said ends of said pins projecting outwards from the front of said member and the said probe contacting end of each pin being shaped to have an end face which angularly conforms to a preselected shape for said contour at the position occupied by the end of the pin in defining said contour, and means for locking said pins in said holes at respective translational positions rendering the ends of said pins definitive of said contour and for locking said pins against rotation in said holes, said member having formed thereon a plurality of secondary locating faces each of known position with respect to one of said primary locating faces, said secondary locating faces providing reference positions facilitating setting of said pins into the positions thereof definitive of said contour.

References Cited in the file of this patent

UNITED STATES PATENTS

| 634,374 | Stahl | Oct. 3, 1899 |
| --- | --- | --- |
| 2,028,503 | Doherty | Jan. 21, 1936 |
| 2,410,888 | Lucy | Nov. 12, 1946 |
| 2,697,879 | Tandler | Dec. 28, 1954 |

FOREIGN PATENTS

| 491,937 | Germany | Feb. 17, 1930 |
| --- | --- | --- |
| 153,028 | Australia | Aug. 31, 1953 |